(12) United States Patent
Correia Villa Real et al.

(10) Patent No.: US 11,650,812 B2
(45) Date of Patent: May 16, 2023

(54) ASSET IDENTIFICATION FOR COLLABORATIVE PROJECTS IN SOFTWARE DEVELOPMENT

(71) Applicant: International Business Machines Corporation, Armonk, NY (US)

(72) Inventors: Lucas Correia Villa Real, Sao Paulo (BR); Renato Luiz de Freitas Cunha, Sao Paulo (BR); Marcelo Nery dos Santos, Rio de Janeiro (BR); Renan Francisco Santos Souza, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/118,646

(22) Filed: Dec. 11, 2020

(65) Prior Publication Data

US 2022/0188100 A1 Jun. 16, 2022

(51) Int. Cl.
*G06F 8/71* (2018.01)
*G06F 8/65* (2018.01)
*G06F 9/38* (2018.01)

(52) U.S. Cl.
CPC ............... *G06F 8/71* (2013.01); *G06F 8/65* (2013.01); *G06F 9/3836* (2013.01)

(58) Field of Classification Search
None
See application file for complete search history.

(56) References Cited

U.S. PATENT DOCUMENTS

| | | | |
|---|---|---|---|
| 7,596,778 B2 | 9/2009 | Kolawa | |
| 7,631,294 B2* | 12/2009 | Rush | G06F 8/33 717/111 |
| 7,797,244 B2 | 9/2010 | Hoke, Jr. | |
| 8,037,453 B1 | 10/2011 | Zawadzki | |
| 8,874,533 B1 | 10/2014 | Smith | |
| 9,569,449 B2* | 2/2017 | Taylor | G06Q 10/00 |
| 9,852,377 B1* | 12/2017 | Kumar | G06F 16/22 |
| 9,898,393 B2 | 2/2018 | Moorthi | |
| 10,783,151 B1* | 9/2020 | Bushkin | H04L 67/306 |
| 11,334,642 B2* | 5/2022 | Weng | G06F 16/958 |

(Continued)

FOREIGN PATENT DOCUMENTS

| CN | 100474305 C | 10/2006 |
|---|---|---|
| CN | 105447062 A | 3/2016 |

(Continued)

OTHER PUBLICATIONS

"Patents Act 1977: Combined Search Report under Section 17(5)(b) and Abbreviated Examination Report under Section 18(3)", Your Reference: DP/P49964GB, Application No. GB2117002.2, dated May 3, 2022, 8 pages.

(Continued)

*Primary Examiner* — Philip Wang
(74) *Attorney, Agent, or Firm* — Stephen R. Yoder

(57) ABSTRACT

Approaches presented herein enable asset identification for collaborative projects in software development. More specifically, a plurality of assets is identified. Content provided by at least one asset of the plurality of assets is determined. A project that is associated with the content provided by the at least one asset is determined. A repository associated with the project to include the at least one asset is updated.

12 Claims, 4 Drawing Sheets

(56) References Cited

U.S. PATENT DOCUMENTS

| | | | |
|---|---|---|---|
| 2004/0249694 A1* | 12/2004 | Luo | G06Q 10/10 |
| | | | 705/7.26 |
| 2005/0137884 A1 | 6/2005 | Baird | |
| 2008/0060051 A1* | 3/2008 | Lim | G06F 21/125 |
| | | | 726/1 |
| 2009/0150906 A1 | 6/2009 | Schmidt | |
| 2018/0075335 A1* | 3/2018 | Braz | G06F 16/24522 |
| 2018/0081881 A1* | 3/2018 | Poddar | G06F 16/24578 |
| 2018/0189706 A1* | 7/2018 | Newhouse | G06Q 10/06316 |
| 2021/0124738 A1* | 4/2021 | Swamy | G06F 16/211 |
| 2021/0248482 A1* | 8/2021 | Figueredo de Santana | |
| | | | G06F 16/252 |
| 2021/0406269 A1* | 12/2021 | Xiong | G06N 20/00 |

FOREIGN PATENT DOCUMENTS

| | | | |
|---|---|---|---|
| CN | 106228074 A | 12/2016 | |
| CN | 111383082 A | 7/2020 | |
| EP | 2261829 A2 | 12/2010 | |
| WO | 0163528 A1 | 7/2002 | |
| WO | 2019239877 A1 | 12/2019 | |

OTHER PUBLICATIONS

"Reply to UK Exam Report", UK Patent Application No. 2117002.2, Our ref DP/P49964GB, dated Aug. 10, 2022, 3 pages.

"Patents Act 1977: Examination Report under Section 18(3)", Your Reference: DP/P49964GB, Application No. GB2117002.2, dated Oct. 10, 2022, 5 pages.

* cited by examiner

ASSET IDENTIFICATION FOR COLLABORATIVE PROJECTS IN SOFTWARE DEVELOPMENT

BACKGROUND OF THE INVENTION

The present invention relates generally to the field of software development, and more particularly to identifying assets of a collaborative project related to contributors of said project.

Collaborative projects are complex projects that include a variety of members across various departments and organizations to complete. During the project's lifecycle, various assets are generated by the members, or contributors, to the project. In software development, these assets may include code, modules, or libraries.

SUMMARY

Embodiments of the present invention provide a method, system, and program product to automatically update a project repository with new assets. A processor identifies a plurality of assets. A processor determines content provided by at least one of the plurality of assets. A processor determines the content provided by the at least one asset is associated with a project. A processor updates a repository associated with the project to include the at least one asset.

One aspect of the present invention includes a method, comprising: identifying, by one or more processors, a plurality of assets, determining, by the one or more processors, content provided by at least one asset of the plurality of assets, determining, by the one or more processors, a project that is associated with the content provided by the at least one asset, and updating, by the one or more processors, a repository associated with the project to include the at least one asset.

Another aspect of the present invention includes a computer program product, comprising: one or more computer-readable storage media and program instructions stored on the one or more computer-readable storage media, the program instructions comprising: program instructions to identify a plurality of assets, program instructions to determine content provided by at least one asset of the plurality of assets, program instructions to determine a project that is associated with the content provided by the at least one asset, and program instructions to update a repository associated with the project to include the at least one asset.

Yet another aspect of the present invention includes a computer system, comprising: one or more computer processors, one or more computer readable storage media, and program instructions stored on the computer readable storage media for execution by at least one of the one or more processors, the program instructions comprising: program instructions to identify a plurality of assets, program instructions to determine content provided by at least one asset of the plurality of assets, program instructions to determine a project that is associated with the content provided by the at least one asset, and program instructions to update a repository associated with the project to include the at least one asset.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
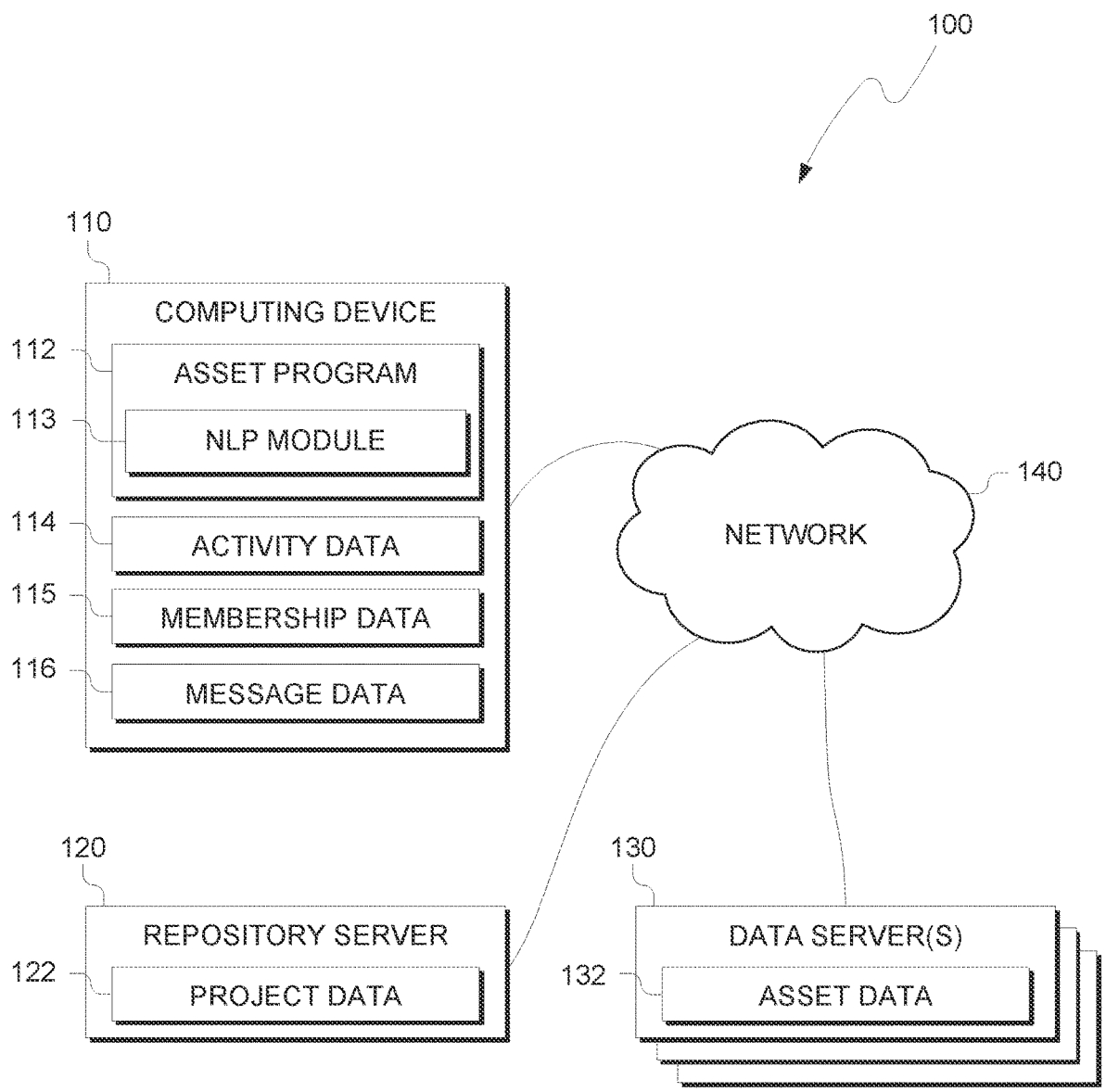
FIG. 1 is a functional block diagram illustrating a networked environment, in accordance with an exemplary embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

While solutions to asset tracking are known, prior solutions require manual input or direct interaction from a user to add, update or otherwise keep track of each asset associated with a project. Additionally, prior solutions would also omit or not detect other external assets to a project, such as a publication or paper detailing functions of a product or service associated with the project, making asset discoverability and tracking limited in scope. Additionally, other important assets and resources that include collaborative discussions that occur outside the normal channels associated with the project are often forgotten or not included in project documentation, such as a message board discussions or instant messaging chat logs.

By collecting assets from a variety of sources outside of a project repository, embodiments of the present invention recognize that improvements to prior solutions for asset management and tracking in a project are provided. By identifying new potential assets, determining the content, and identifying relevant projects in regard to the assets, embodiments of the present invention provide for improvements to asset tracking during a project's lifecycle. By automatically digesting and finding relevant publications, messages and other forms of discussion made by project members, embodiments of the present invention increase the amount and various types of documentation and discussion to better inform the members of the project on the on goings and functionality of the project as well as the project's components The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110, repository server 120, data server 130 connected over network 140. Computing device 110 includes asset program 112, natural language processing (NLP) module 113, activity data 114, membership data 115 and message data 116. Repository server 120 includes project data 122. Data server(s) 130 include asset data 132.

In various embodiments of the present invention, computing device 110, repository server 120 and data server(s) 130 are each a computing device that can be a standalone device, a server, a laptop computer, a tablet computer, a netbook computer, a personal computer (PC), or a desktop computer. In another embodiment, computing device 110, repository server 120 and data server(s) 130, individually or collectively, represent a computing system utilizing clustered computers and components to act as a single pool of seamless resources. In general, computing device 110, repository server 120 and data server(s) 130 can be any computing device or a combination of devices with access to activity data 114, membership data 115, message data 116, project data 122 and asset data 132 and is capable of executing asset program 112 and NLP module 113. Computing device 110, repository server 120 and data server(s) 130 may each include internal and external hardware components, as depicted and described in further detail with respect to FIG. 4.

In this exemplary embodiment, asset program 112, NLP module 113, activity data 114, membership data 115 and message data 116 are stored on computing device 110; project data 122 is stored on repository server 120; and asset data 132 is stored on a respective data server 130. However, in other embodiments, asset program 112, NLP module 113, activity data 114, membership data 115, message data 116, project data 122 and asset data 132 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between computing device 110, repository server 120 and data server(s) 130, in accordance with a desired embodiment of the present invention.

In various embodiments, asset program 112 digests various data sources to identify assets to be included in a project's repository or other form of data store, such as stored in project data 122 of repository server 120. Project data 122 includes, but is not limited to, various documents, deliverables, and other files that are relevant to a project being maintained by repository server 120. In various embodiments, an asset is any data or information relevant to a project or members of the project. For example, in a software development project an asset may be a component of the software being developed, such as a file or excerpt containing code or pseudocode. Additionally, as will become readily apparent to one of ordinary skill in the art based on the discussion contained herein, an asset may also include any research paper, discussion, comments or other forms of communications related to the project or feature of the project. For example, a chat log between two members of a project who are discussing a new feature of the project may be an asset digested and identified by asset program 112. In various embodiments, project members, as discussed herein, are any user or individual that creates, or assists in creating, any project data 122.

In various embodiments, asset program 112 retrieves various asset data 132 from one or more data server(s) 130. Data server(s) 130 include one or more computing devices that store or otherwise provide asset data 132 to asset program 112. Asset data 132 includes any assets that may be relevant or otherwise directed towards a project maintained in project data 122 by repository server 120, as well as other assets that pertain to other projects or topics. Example assets includes, but are not limited to, (i) project components such as drawings, schematics, code, diagrams, or any other design document that project members contribute to a project, (ii) papers or other publications regarding the project, or components or functions of the project, and (iii) any discussion regarding the above assets such as, but not limited to, presentations, conferences or direct communications (e.g., a chat log or forum post) regarding the project or features thereof.

In various embodiments, asset program 112 identifies the relevant assets based on various criteria. In some embodiments, asset program 112 identifies the relevant assets based on activity data 114. Activity data 114 includes information indicative of various project members' activity regarding the access and creation of project data 122 for a project maintained by repository server 120 as well as any activity regarding uploading or accessing documents in asset data 132 stored in one or more data server(s) 130. Activity data 114 includes data indicative of the files or other documents a project member accessed in project data 122; as well as any uploads or changes to data not included or replicated in project data 122 but stored in asset data 132. Based on the project members' activity, asset program 112 identifies the relevant assets that members have accessed, created or edited in data stores or other repositories, such as data server(s) 130, that have not been incorporated in project data 122.

In some scenarios, activity data 114 indicates a project member's activity within a local or enterprise network. For example, a data server of data server(s) 130 is a local data store, where activity data 114 includes access logs of the project members to identify which files were uploaded, changed or otherwise altered by the users. In other scenarios, activity data 114 indicates a project member's activity to various services and websites across the internet. For example, activity data 114 includes a log of websites or other services accessed by a project member.

In some embodiments, asset program 112 identifies assets based on membership data 115. Membership data 115 includes data indicative of the professional associations, trade groups, or any working group that project members participate in, by either publishing papers or other assets to the group or by commenting on work provided by the group (e.g., peer reviews). Additionally, membership data 115 includes data indicative of the data server(s) 130 that include asset data 132 that the project members have created or assisted in creating. Based on the membership data 115 of a project member, asset program 112 identifies asset data 132 for retrieval and digestion as discussed herein.

In some embodiments, asset program 112 identifies assets based on message data 116. In some scenarios, message data 116 includes messages shared between project members via an enterprise instant messaging program, message board, social network or other program that permits communication among users. For example, a chat log is stored in message data 116 between two members of a project. In other scenarios, message data 116 includes asset data 132 posted to one or more data server(s) that includes messages posted by or otherwise involving (e.g., responding to) a project member. As indicated by membership data 115, asset program 112 identifies potential assets for inclusion into project data 122 based on available messages posted to an external messaging platform. For example, a thread that a project member responded to on an external platform is retrieved and stored in message data 116. In some embodiments and scenarios, message data 116 is collected from an enterprise or internal messaging system or social media platform. Additionally, in some embodiments, asset program 112 includes a feature and interface (not shown) that permit users to indicate that a thread or conversation is for recording in message data 116 and that other threads or conversations are, by default, not monitored.

In various embodiments, asset program 112 determines the content of asset data 132 and message data 116. Based on the content of asset data 132 or message data 116, asset program 112 determines if the content is relevant to or otherwise is directed towards a project, or components, parts or functions of said project, maintained by repository server 120 and stored in project data 122. If the content is relevant, then asset program 112 includes the asset pertaining to the content in project data 122. For example, project data 122 includes data, code and other project information pertaining to the ongoing development of a web page for scheduling appointments. In this example, two members discussed on an internal message board the testing of a time-zone function of the scheduling webpage. Based on membership data 115, asset program 112 identifies that the project members participated in the creation of the asset (i.e., the discussion of the time-zone function). As will be discussed herein, asset program 112 determines the content of the discussion and identifies that the discussion is relevant to the content of the project. As such, asset program 112 automatically appends a copy of the discussion to project data 122. In some embodiments, asset program 112 categorizes or provides classification (e.g., assigning a keyword or tag to the asset) to the discussion within project data 122 found user retrieval and identification.

Advantageously, embodiments of the present invention provide for the automatic identification, retrieval and inclusion of assets not included in project data 122, however are otherwise available as asset data 132 or message data 116. By automatically updating and storing various papers, discussions and other assets pertaining to a project, or relevant functions of the project, embodiments of the present invention create a more complete and detailed documentation for the project. Many external discussions regarding a project, be it through informal (e.g., chat or forum posts) or formal (e.g., research papers or presentations) means can provide greater detail to other project members regarding the on goings and current progress of a project. As previously discussed, prior solutions require manual editing by a project manager or other user to include such documentation of assets.

In various embodiments, asset program 112 determines the content of asset data 132 to identify if the relevant assets are not already part of project data 122, in addition to being relevant to the project, or any component of the project. Asset program 112 includes Natural Language Processing (NLP) module 113 to determine the content of asset data 132 and project data 122. First, NLP module 113 segments the text from the asset into sentences or stems. Then, NLP module 113 tokenizes and tags the various words of the sentence, extracting certain keywords relevant to the subject matter of project data 122. Once the text of the asset is parsed, entities or subjects are extracted for comparison to entities relevant to the project. Then, NLP module 113 determines relationships among the extracted entities. Based on the extracted keywords and relationships of asset data 132 and message data 116, NLP module 113 determines if the assets or messages are relevant or otherwise related to any ongoing projects maintained by repository server 120 as project data 122.

In some embodiments, asset program 112 determines if an asset includes syntax or any other arrangements of text that may be relevant to a project. For example, project data 122 includes a project for developing a mobile application which has numerous lines of code in various libraries or modules. When identifying if an asset is relevant to a project, asset program 112 compares portions of existing code in project data 122 to asset data 132 or message data 116. If the asset or message includes syntax similar to that stored in project data 122, then asset program 112 identifies any changes or additional assets or content that is not present in project data 122. In response, asset program 112 updates project data 122 to include the additional information provided in the asset or message found to have similar syntax as components of the project. In some scenarios, asset program 112 decomposes or separates various files and libraries in project data 122 for comparison purposes (e.g., asset program 112 extracts various function headers from method calls in source code to identify similar functions found in other data sources, such as message data 116 and asset data 132). In other scenarios, asset program 112 generates or is provided an ontology or set of relationships between the various components of the project. Based on the ontology of the project, asset program 112 categorizes and stores new assets or messages based on the categorization of the asset or message.

In some embodiments, NLP module 113 of asset program 112 digests project data 122 and asset data 132 to determine if content matches with the various components or parts of a project stored in project data 122. For example, project data 122 includes various source files, libraries and other files of a software development project. Initially, NLP module 113 digests the content of project data 122 and determines various classifiers, tags or other names, phrases, stems or words that are indicative of the content of the project. In this software development project example, NLP module 113 identifies various method headers and determines a tag or classification for the type of function provided based on the method call's name as well as various inputs, variables and outputs contained in each block of code. Then, while evaluating asset data 132 for inclusion to the project, NLP module 113 identifies content in asset data 132 that is relevant to or otherwise discuses the functions, inputs, variables, output, etc. initially determined to be part of project data 122. If NLP module 113 identifies any similar content between project data 122 and asset data 132, then asset program 112 uploads or otherwise saves the content from asset data 132 to project data 122. Referring back to the software development example, asset program 112 saves the content to project data 122 and creates a link to new asset data 132 in a folder or file of the content in project data 122 that matches the new asset data 132.

In some scenarios and embodiments, asset program 112 determines a collaboration graph based on interactions among project members. For example, asset program 112 analyzes message data 116 to identify the project members who frequently collaborate with one another. In such scenarios and where a project member has been identified in providing new assets, asset program 112 additionally identifies any asset data 132 or message data 116 that the collaborators have created for potential inclusion in project data 122. Additionally, in some embodiments, asset program 112 updates project data 122 with a new asset or message, asset program 112 messages, or causes another program to send a message, informing the collaborators of the update to project data 122. For larger projects, by only informing changes based on the collaboration graph, asset program 112 only notifies those project members who have collaborated on such components of the project beforehand.

In various embodiments, asset program 112 compares asset data 132 and message data 116 to project data 122. Initially, asset program 112 identifies if the asset or message may be part of, or be in regard to, an existing project. Based on the contributors of the asset or message, and/or the content of the asset or message, asset program 112 identifies that the asset or message should be included with a particular project in project data 122. In response, asset program 112 creates a new entry in project data or appends or updates a previous entry with the asset or message. For example, asset program 112 identifies a research paper that discusses an aspect of a project that was published to scientific journal. In response, asset program 112 updates the portion of project data 122 related to the aspect with a link to the research paper. In another example, two project members are chatting one night via an internal enterprise instant messaging application that is monitored and subsequently stored in messaged data 116. A portion of the chat discusses a new phase of the project. In response to detecting this portion of the chat, asset program 112 appends the discussion to documentation in project data 122 associated with the new phase of the project. Additionally, in some embodiments, asset program 112 determines that this new phase is not documented yet in project data 122. In response, asset program 112 updates an ontology or other categorization of project data 122 to indicate the new phase of the project.

In some scenarios and embodiments, asset program 112 identifies that asset or message is not related to any ongoing project and is a new project. For example, based on the output of NLP module 113, asset program 112 determines that a post to an internal forum for a company involves several new collaborators and a new client entity. In response, asset program 112 automatically creates a new project in project data 122. In some scenarios, asset program 112 identifies a project in project data 122 that matches the new project. Given a match based on either the content of the messages regarding the new project or the collaborators discussing the new project, asset program 112 determines the closest existing project in project data 122, then copying a portion of the project's data to serve as a template for the new project.

If during operation asset program 112 does not find a match for an existing project nor that the asset or message does not indicate a new project, then asset program 112 may ignore the asset or message for the time being, however asset program will retain any content analysis and collaboration mappings for later processing. As newer messages or assets are posted over time, asset program 112 may reevaluate an asset or series of messages for inclusion in a project.

Figure 2:
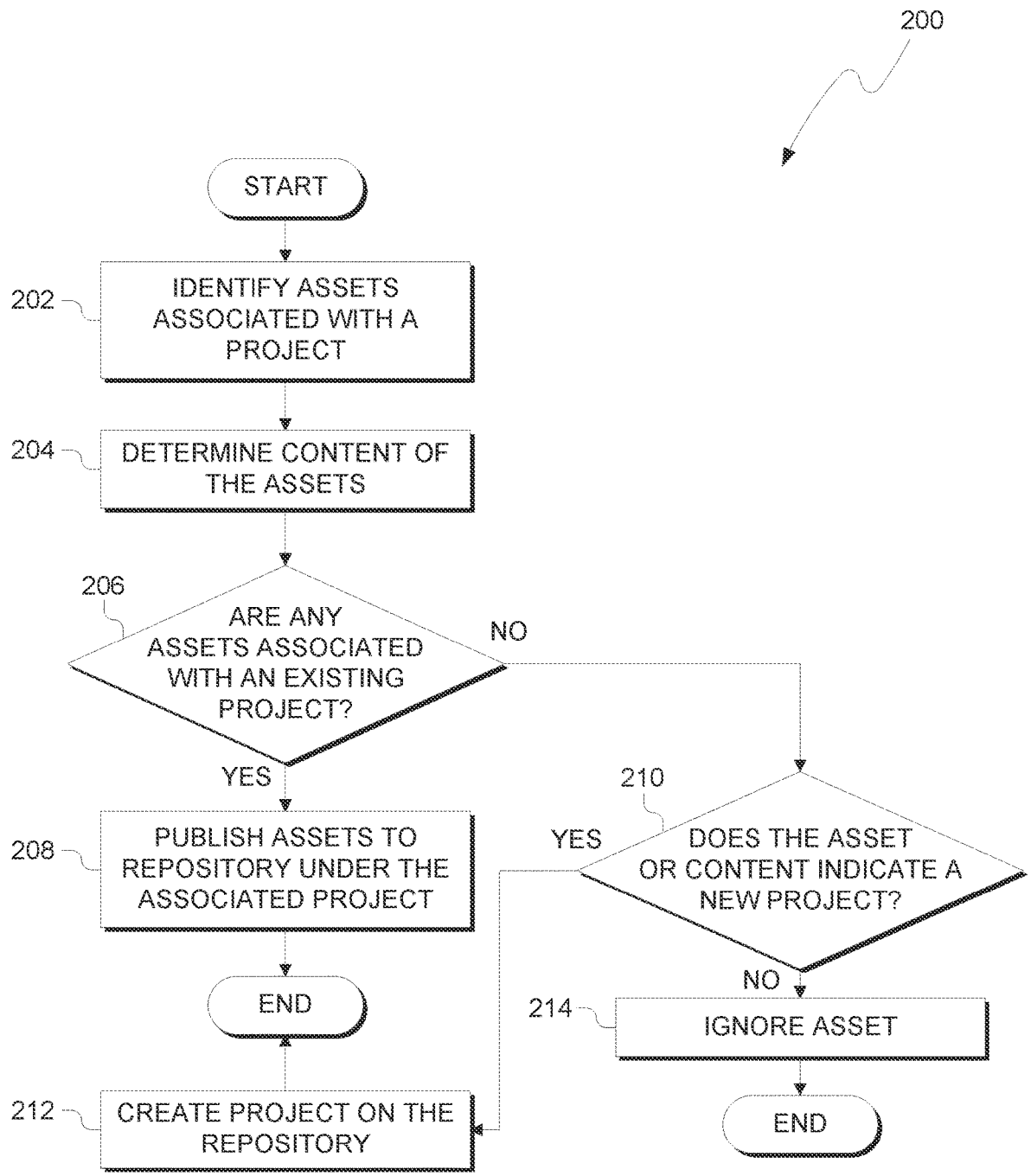
FIG. 2 illustrates operational processes of an asset program determining when to update a project with additional assets, on a computing device within the environment of FIG. 1, in accordance with an exemplary embodiment of the present invention.
Figure 3:
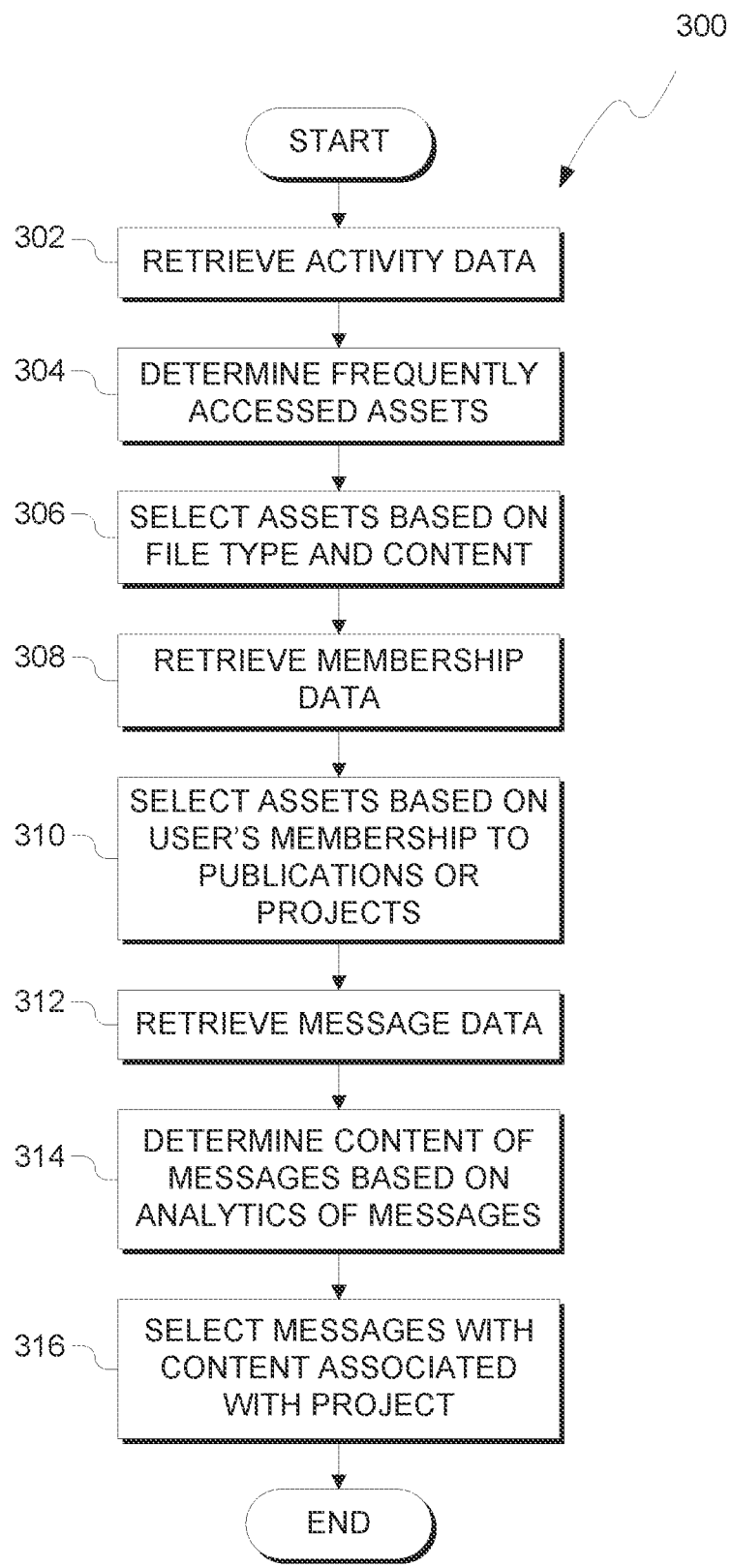
FIG. 3 illustrates operational processes of an asset program identifying relevant assets to consider for inclusion to a project, on a computing device within the environment of FIG. 1, in accordance with an exemplary embodiment of the present invention.

FIG. 2 illustrates operational processes, generally designated as 200, of asset program 112 determining when to update a project with additional assets. In process 202, asset program 112 identifies any assets associated with a project. Based on activity data 114 or membership data 115, asset program 112 identifies any asset such as asset data 132 or message data 116 associated with a project. In process 204, asset program 112 determines the content of the asset data 132 or message data 116 associated with the user. In some scenarios, asset program 112 ranks asset data 132 or message data 116 based on a variety of factors. FIG. 3 discusses the above processes 200 and 204 in additional detail.

In decision process 206, asset program 112 determines if any of the identified assets associated with a user (process 202) can be associated with a project in project data 122 of repository server 120. As discussed herein, project data 122 or repository server 120 includes various deliverables and documentation relating to one or more ongoing projects. Based on the content of asset data 132 or message data 116 (process 204), as well as the activity data 114 or membership data 115 of a user associated with the project (process 202), asset program compares the content, activity and membership of a user attributed assets and messages to one or more projects. If a preexisting project is identified (YES branch of decision process 206), then asset program 112 publishes the assets or messages to under to identified project in project data 122 of repository server 120 (process 208). In one example, a presentation slide deck has been created by a user associated with a project. Within the presentation, a slide includes pseudocode for a sorting algorithm used in a project. In this example, asset program 112 extracts the pseudocode as text, determines the content is related to a project's sorting algorithm based on NLP module 113 (e.g., the content is a sorting algorithm) and membership data 115 (e.g., the author is a member of the project's contributors), and in response, publishes the slide to project data 122 (process 208). Moreover, if a chat log between two users includes references to a project name, or if the NLP module 113 scan of a scientific paper identifies a potential project name, for instance, then local folders named after that project name are also stored in project data 122 of repository server 120. For example, a paper named "The SuperScanner Project" could lead to the storage of a local folder named "SuperScanner" to project data 122.

If asset program 112 does not identify a matching existing project (NO branch of decision process 206), then asset program 112 determines if the asset or message discusses or otherwise is directed towards the start of a new project (decision process 210). Based on the content of the asset or message, asset program 112 determines if the discussion contained in the asset or message indicates a new project and, in some instances and scenarios, a similar project in project data 122. When an asset or message indicates that a new project is being started (YES branch of process 210), then asset program 112 creates a new project in project data 122 or repository server 120 (process 212). For example, if a chat log between two users includes content that discusses creating a bid or other introductory step to a project (e.g., as represented by a project ontology), then asset program 112 creates a new project in project data 122 (process 212). In such instances, asset program 112 may identify other contextual information, by way of NLP module 113, to determine if the new project is similar to other projects stored in project data 122. For example, asset program 112 determines, based on the contents of the conversation, a client organization with the open bid order. In such a scenario, project data 122 may be populated with information indicating the client when created (process 212).

If asset program 112 is unable to determine a corresponding (NO branch of decision process 206) project or that the asset or message does not indicate a new project (NO branch of decision process 210), then asset program 112 ignores the asset or message for the time being (process 214). In some instances, asset program 112 retains information generated in processes 202 and 204 for later analysis. For message data 116, additional comments or remarks may be added at a later time, providing for better classification by NLP module 113. In such instances, assets or messages while initially ignored may be later included based on additional content determined in later analysis of changes to the asset or message.

While the above discusses the process in light of a single project, one of ordinary skill in the art will appreciate that the above processes may be performed in any order as well as along a variety of criteria. For example, asset program 112 may retrieve and analyze content in asset data 132 and message data 116 as the assets and messages are created. In another scenario, asset data 132 and message data 116 may be retrieved and analyzed based on sources, where assets and message are digested across multiple projects and project members.

FIG. 3 illustrates operational processes, generally designated as 300, of asset program 112 identifying relevant assets to consider for inclusion to a project. In process 302, asset program 112 retrieves activity data 114. Activity data 114 indicates the files and other assets that a user has accessed over time. Based on the rate of access for a given user, asset program 112 determines the frequency the user accesses the assets (process 304). The more frequently a particular user edits or accesses a file the more likely the file is important to the project member and therefore the project. In certain embodiments and scenarios, asset program 112 ranks the assets based on the frequency of access, analyzing and determining if said frequently accessed files are relevant to a project for inclusion as discussed in regard to FIG. 2.

In process 306, asset program 112 selects and orders assets based on file type and content. For certain types of projects, asset program 112 includes a ranking of file types and content that indicated the importance of various file types and content that is be discussed in an asset. For example, slide decks for presentations may be ranked higher during an initial phase of a project, while later production focus phases may rank other deliverables, such as schematics or diagrams higher.

In process 308, asset program 112 retrieves membership data 115. Membership data 115 indicates the publications that users have made either to external organizations, such as a scientific journal, or internally, such as through invention disclosures and other internal presentations or discussions. In process 310, based on the various memberships, and subsequently the number of project members, that contribute to each forum, asset program 112 identifies and ranks assets based on the number of contributing project members or in some instance, each publication source is assigned a pre-determined rank (e.g., a publication to a scientific journal discussing a project, or aspects thereof, is ranked over a webpage article with a quote from a project member.

In process 312, asset program 112 retrieves message data 116. Message data 116 is any communication involving, either as a creator or recipient, at least one project member. As discussed herein NLP module 113 determines the content of message data 116 (process 314). Based on various factors, such as but not limited predetermined topics being discussed or the "level" of information (i.e., entropy of the message indicates how informative a message is, where "today is warm" has less information than the message "today it is 72° F.") included in the message data 116, asset program 112 selects and ranks messages from message data 116. Asset program 112 assigns higher ranks to messages that discuss pre-determined important topics to a project or contain more informative statements regarding the same topic or content. Based on the content contained in message data 116 matching content of project data 122, asset program 112 selects message data 116 to be associated with the project (process 316).

Figure 4:
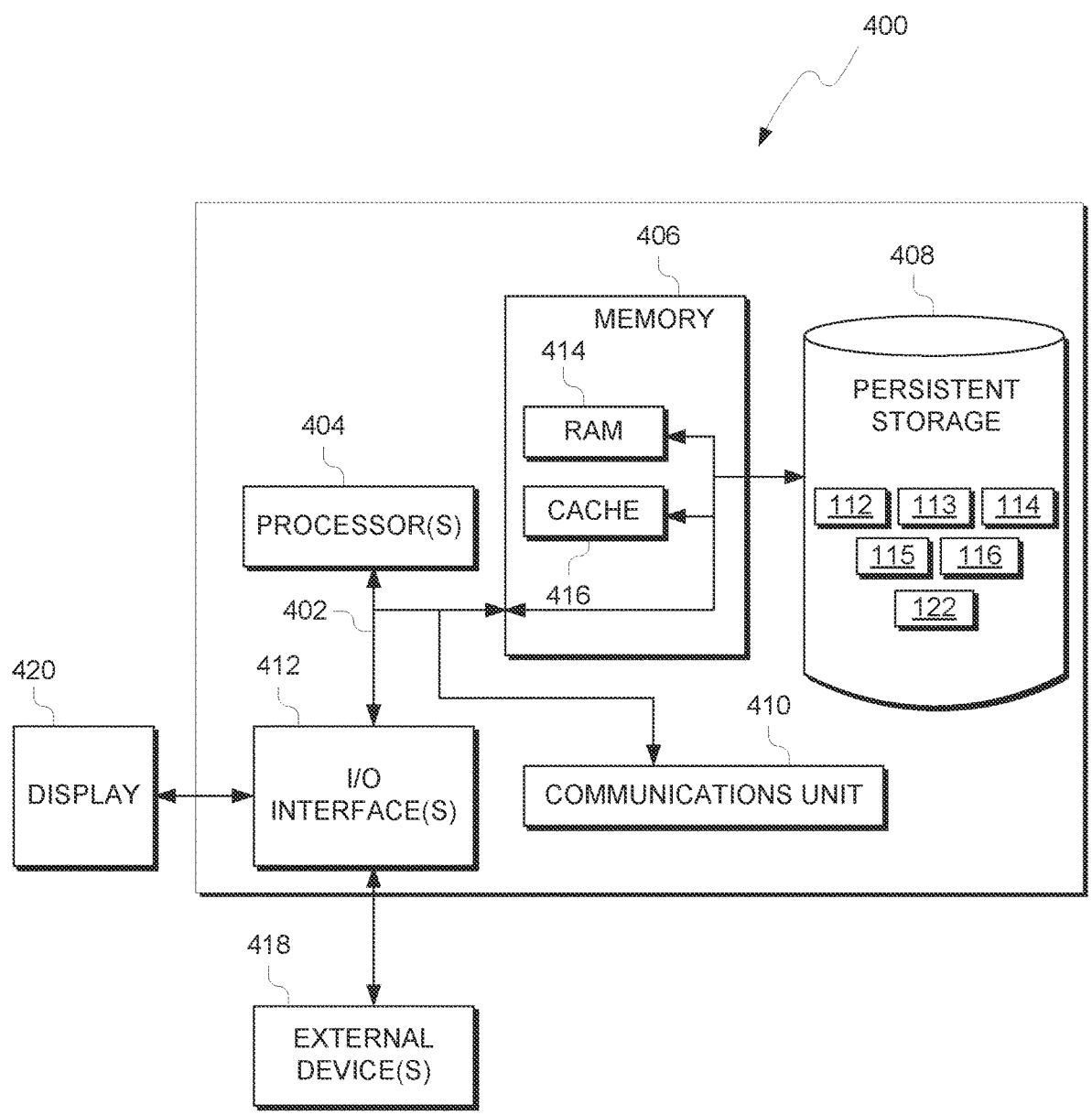
FIG. 4 depicts a block diagram of components of the computing device executing an asset program, in accordance with an exemplary embodiment of the present invention.

FIG. 4 depicts a block diagram, 400, of components of computing device 110, repository server 120 and data server(s) 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110, repository server 120 and data server(s) 130 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Asset program 112, NLP module 113, activity data 114, membership data 115, message data 116, project data 122 and asset data 132 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 140. In these examples, communications unit 410 includes one or more network interface cards. Communications unit 410 may provide communications through the use of either or both physical and wireless communications links. Asset program 112, NLP module 113, activity data 114, membership data 115, message data 116, project data 122 and asset data 132 may be downloaded to persistent storage 408 through communications unit 410.

I/O interface(s) 412 allows for input and output of data with other devices that may be connected to computing device computing device 110, repository server 120 and data server(s) 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., asset program 112, NLP module 113, activity data 114, membership data 115, message data 116, project data 122 and asset data 132, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, comprising:
   identifying, by one or more processors, a plurality of assets, wherein at least one asset includes programming code;
   determining, by the one or more processors, content of the at least one asset based on natural language processing of the programming code contained in the at least one asset;
   determining, by the one or more processors, a project that is associated with the content provided by the at least one asset;
   determining, by the one or more processors, a ranking of the at least one asset based, at least in part, on membership of a project member who contributed to the at least one asset; and
   updating, by the one or more processors, a repository associated with the project to include the at least one asset, wherein the at least one asset is added to the repository in accordance with the determined ranking of the at least one asset.

2. The method of claim 1, the method further comprising:
   responsive to a determination that the content corresponds with a new project, creating, by the one or more processors, a new entry in the repository, wherein the new entry includes the at least one asset.

3. The method of claim 1, wherein the plurality of assets includes a plurality of messages, wherein the plurality of messages is shared in a discussion involving at least one member of the project.

4. The method of claim 3, the method further comprising:
   determining, by the one or more processors, content provided by at least one message of the plurality of messages; and
   responsive to the content provided by the at least one message of the plurality of messages, wherein the content provided by the at least one message indicates that the discussion includes the project, updating, by the one or more processors, the repository associated with the project to include the at least one message.

5. A computer program product comprising:
   one or more computer-readable storage media and program instructions stored on the one or more computer-readable storage media, the program instructions comprising:
   program instructions to identify a plurality of assets, wherein at least one asset includes programming code;
   program instructions to determine content of the at least one asset based on natural language processing of the programming code contained in the at least one asset;
   program instructions to determine a project that is associated with the content provided by the at least one asset;
   program instructions to determine a ranking of the at least one asset based, at least in part, on membership of a project member who contributed to the at least one asset; and
   program instructions to update a repository associated with the project to include the at least one asset, wherein the at least one asset is added to the repository in accordance with the determined ranking of the at least one asset.

6. The computer program product of claim 5, the program instructions further comprising:
   responsive to a determination that the content corresponds with a new project, program instructions to create a new entry in the repository, wherein the new entry includes the at least one asset.

7. The computer program product of claim 5, wherein the plurality of assets includes a plurality of messages, wherein the plurality of messages is shared in a discussion involving at least one member of the project.

8. The computer program product of claim 7, the program instructions further comprising:
   program instructions to determine content provided by at least one message of the plurality of messages; and
   responsive to the content provided by the at least one message of the plurality of messages, wherein the content provided by the at least one message indicates that the discussion includes the project, program instructions to update the repository associated with the project to include the at least one message.

9. A computer system comprising:
   one or more computer processors;
   one or more computer readable storage media; and
   program instructions stored on the computer readable storage media for execution by at least one of the one or more processors, the program instructions comprising:
   program instructions to identify a plurality of assets, wherein at least one asset includes programming code;
   program instructions to determine content of the at least one asset based on natural language processing of the programming code contained in the at least one asset;
   program instructions to determine a project that is associated with the content provided by the at least one asset;
   program instructions to determine a ranking of the at least one asset based, at least in part, on membership of a project member who contributed to the at least one asset; and
   program instructions to update a repository associated with the project to include the at least one asset, wherein the at least one asset is added to the repository in accordance with the determined ranking of the at least one asset.

10. The computer system of claim 9, the program instructions further comprising:
    responsive to a determination that the content corresponds with a new project, program instructions to create a new entry in the repository, wherein the new entry includes the at least one asset.

11. The computer system of claim 9, wherein the plurality of assets includes a plurality of messages, wherein the plurality of messages is shared in a discussion involving at least one member of the project.

12. The computer system of claim 11, the program instructions further comprising:
    program instructions to determine content provided by at least one message of the plurality of messages; and
    responsive to the content provided by the at least one message of the plurality of messages, wherein the content provided by the at least one message indicates that the discussion includes the project, program instructions to update the repository associated with the project to include the at least one message.

* * * * *